United States Patent [19]
Kuster et al.

[11] Patent Number: 4,859,225
[45] Date of Patent: Aug. 22, 1989

[54] METHOD AND DEVICE FOR CURVING SHEETS OF GLASS

[75] Inventors: Hans-Werner Kuster, Aachen, Fed. Rep. of Germany; Herbert Radermacher, Raeren; Luc Vanaschen, Eupen, both of Belgium

[73] Assignee: Saint-Gobain Vitrage, Paris, France

[21] Appl. No.: 191,326

[22] Filed: May 9, 1988

[30] Foreign Application Priority Data

May 7, 1987 [DE] Fed. Rep. of Germany ....... 3715151

[51] Int. Cl.$^4$ ........................................... C03B 23/035
[52] U.S. Cl. ........................................ 65/104; 65/106; 65/107; 65/273; 65/287; 65/289
[58] Field of Search ................. 65/104, 106, 107, 273, 65/287, 289

[56] References Cited

U.S. PATENT DOCUMENTS

| | | | |
|---|---|---|---|
| 2,123,552 | 7/1938 | Helwig | 65/287 X |
| 2,665,524 | 1/1954 | Brown | 65/106 |
| 4,092,141 | 5/1978 | Frank | 65/273 X |
| 4,204,854 | 5/1980 | McMaster et al. | 65/104 X |

*Primary Examiner*—Arthur Kellogg
*Attorney, Agent, or Firm*—Oblon, Spivak, McClelland, Maier & Neustadt

[57] ABSTRACT

A method and installations for curving sheets of glass. The sheets of glass (9) are heated to the curving temperature in a horizontal position in a continuous furnace (1) and are pressed in a curving station (4) which is adjacent to the continuous furnace (1) by means of an annular frame against a solid surface curving form (40). During the pressing between the annular frame and the solid surface curving form (40), the sheets of glass (9) are pressed against said solid surface curving form (40), in the area located inside the annular frame, by the static pressure of a hot gas under pressure, with the static pressure of the gas being produced in a chamber (32) whose upper surface (33) is defined by the annular frame and is closed by the sheet of glass (9) applied in a sealed manner against said annular frame.

24 Claims, 8 Drawing Sheets

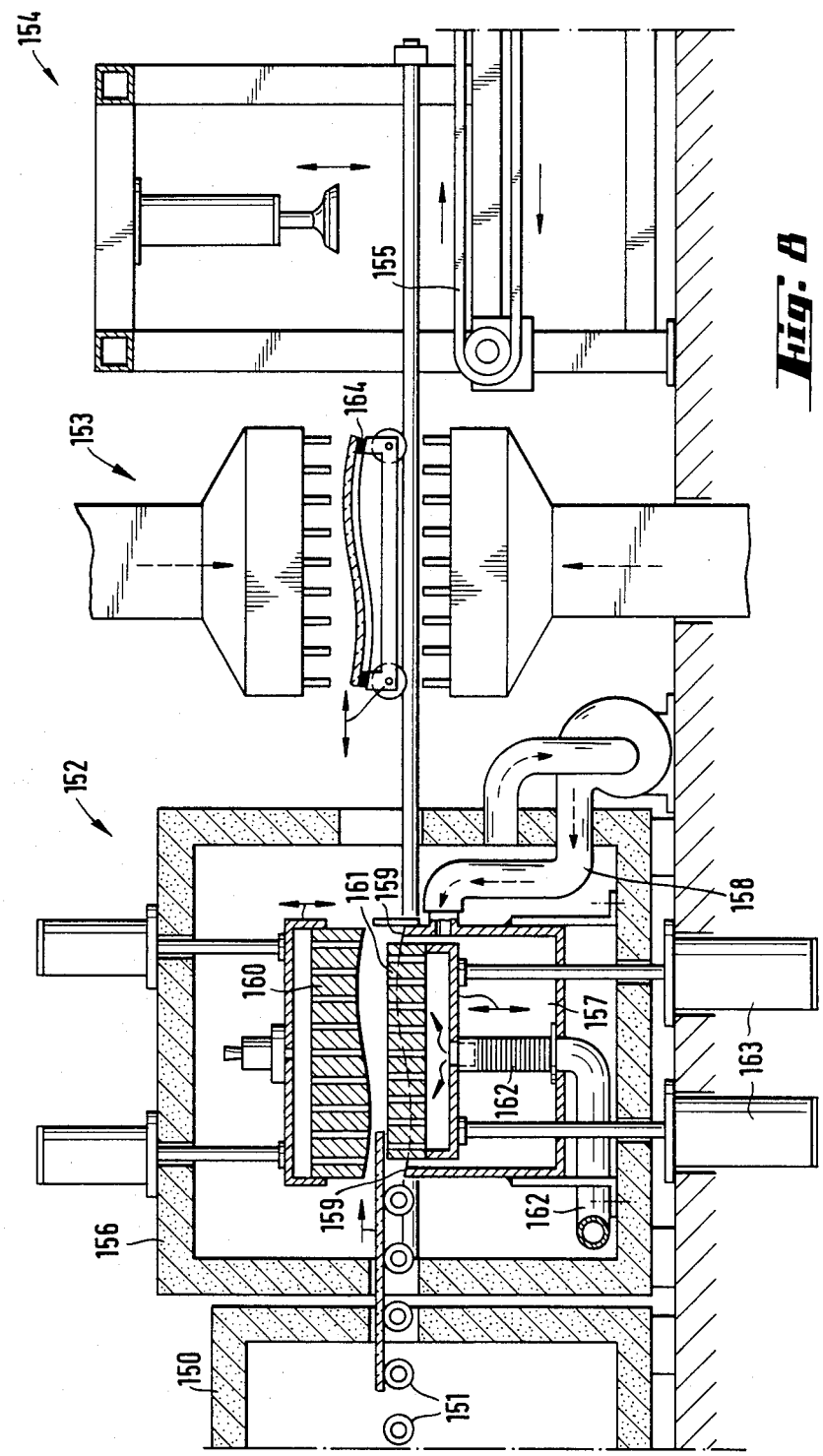

METHOD AND DEVICE FOR CURVING SHEETS OF GLASS

BACKGROUND OF THE INVENTION

1. Field of the Invention

The present invention relates to the curving of sheets of glass in accordance with the technique wherein the sheets of glass are heated to the curving temperature in a horizontal position in a continuous furnace and are pressed against a curving form with a solid surface by means of a forming frame in a curving station arranged after the continuous furnace, then are taken to a cooling station by means of a support frame.

2. Background of the Prior Art

In the case of the known method described above, the sheets of glass enter the curving station on a bed of hot gas, are pressed against the solid surface curving form by means of a forming frame which can be moved upward and downward, are held by suction against the solid surface curving form and, after lowering the forming frame, are deposited on a support which can be translated between the curving station and the cooling station (U.S. Pat. No. 3,846,104).

This known method does not enable the manufacture of glazings with complex curves, that is, glazings which have both convex curved areas and concave curved areas.

In addition, a method for curving sheets of glass is known, in accordance with which, in the curving station, a current of hot gas is directed onto the sheets of glass and the flow as well as the pressure of the current of hot gas are regulated such that the sheets of glass are pressed by said current of hot gas against the curving form and are curved into their final shape (EP 169,770). Using this known method, it is indeed possible to act on the majority of the surface of the glazing using uniform pressure and, thus, to produce complex shapes. However, since, in this method, the curving forces are essentially produced by the dynamic pressure of the gas current and since the fraction of dynamic pressure which can be used for the curving is generally insufficient in the marginal areas of the sheets of glass, that is, in the regions where they are highly curved towards the top and do not permit pressing of these marginal areas in order to apply them closely against the curving form, this known method of curving is not suitable for the manufacture of very highly curved glazings.

The object of the invention is to develop a method such that even very highly curved glazings and/or those with complex curves can be manufactured.

SUMMARY OF THE INVENTION

The method in accordance with the invention is characterized in that the glazings, in a curving station, during the pressing between a forming frame and a solid surface shape, are pressed, in the area situated inside the forming frame, by the static pressure of a hot gas under pressure, against the solid surface curving form, with the static pressure being produced in a chamber, one surface of which is composed of the annular forming frame closed by the glazing applied in a sealed manner against said annular frame.

Due to the combination of the mechanical pressing by means of an annular frame and the pressing on the entire surface situated inside said frame by means of a hot gas under pressure, uniform pressure is obtained over the entire surface, which results in the glazing being pressed in a manner completely independent from the frame by means of its entire surface against the solid surface curving form. The production of the forces of pressure by the purely static pressure of the hot gas then has the additional advantage of only requiring relatively little energy.

The method in accordance with the invention can be used in various ways. Thus, it is, for example, possible to install the solid surface curving form in the upper position, with the annular frame defining the pressure chamber in the lower position. Similarly, the solid surface curving form can also be used in the lower position and the annular frame defining the pressure chamber in the upper position. In this case, it is preferable to manufacture the curving form with a solid lower surface in two parts, that is, one part forming an exterior crown and one part forming the surface inside said crown, with the exterior crown then being used for the subsequent transport of the curved glazing and comprising a support frame which separates from the central part.

The transfer of a sheet of glass heated to the curving temperature from the heating furnace to the curving station can also be carried out in various ways. For example, it can be arranged that the sheet of glass heated inside the heating furnace is raised by a suction-plate and is brought by said suction-plate into the curving station where it is deposited onto the lower curving tool. As an alternative, insofar as the pressing chamber is the lower pressing tool, it can be produced in the form of a component which can be moved between the curving station and the furnace and deposit thereon the sheet of glass heated in the heating furnace using a suction-plate which can be moved upward and downward. It is also possible to manufacture the pressure chamber containing the annular frame in two parts and to render movable the part bearing the annular frame which takes up the glazing inside the furnace and, after having returned into the curving station, applies itself in a sealed manner against the lower part of the pressure chamber and, with said lower part, forms the complete pressure chamber.

In accordance with another embodiment, it is also possible to transport the sheets of glass into the curving station on transporter rollers, to raise them with a current of hot gas directed from the bottom towards the top in order to apply them against the solid surface curving form arranged above the transported rollers and to hold them in this manner against the curving form by means of the current of hot gas, to laterally remove the transporter rollers and to reunite the pressing tools, it being understood that at this time the current of gas maintaining the sheet of glass against the upper form is interrupted when the two forming tools are pressed against one another and that pure static pressure is produced.

The transport of the curved glazing from the curving station to the cooling station takes place in all cases using a support frame on which the glazing is deposited by the upper forming tool after the curving operation.

In accordance with another embodiment of the invention, it is possible arrange it such that the sheets of glass to be curved are transported through the heating furnace on a curving component in the form of a frame, without jolts, and which are heated to the curving temperature, with the curving component in the form of a frame being configured such that it cooperates, inside the curving station, with a pressure chamber and such that, with the sheet of glass, it forms the closing wall of the pressure chamber. This embodiment is particularly suitable for the curving of sheets of glass arranged in pairs, that is the curving of sheets of glass which are intended for the manufacture of laminated safety glazings.

BRIEF DESCRIPTION OF THE DRAWINGS

Various examples of embodiments of the method of the invention and devices suitable for carrying it out will be described below in more detail by reference to the drawings, in which:

FIG. 8 is another embodiment of a curving station in which the sheets of glass are arranged on a table with a retractable gas cushion.

DETAILED DESCRIPTION OF THE INVENTION

Figure 1:
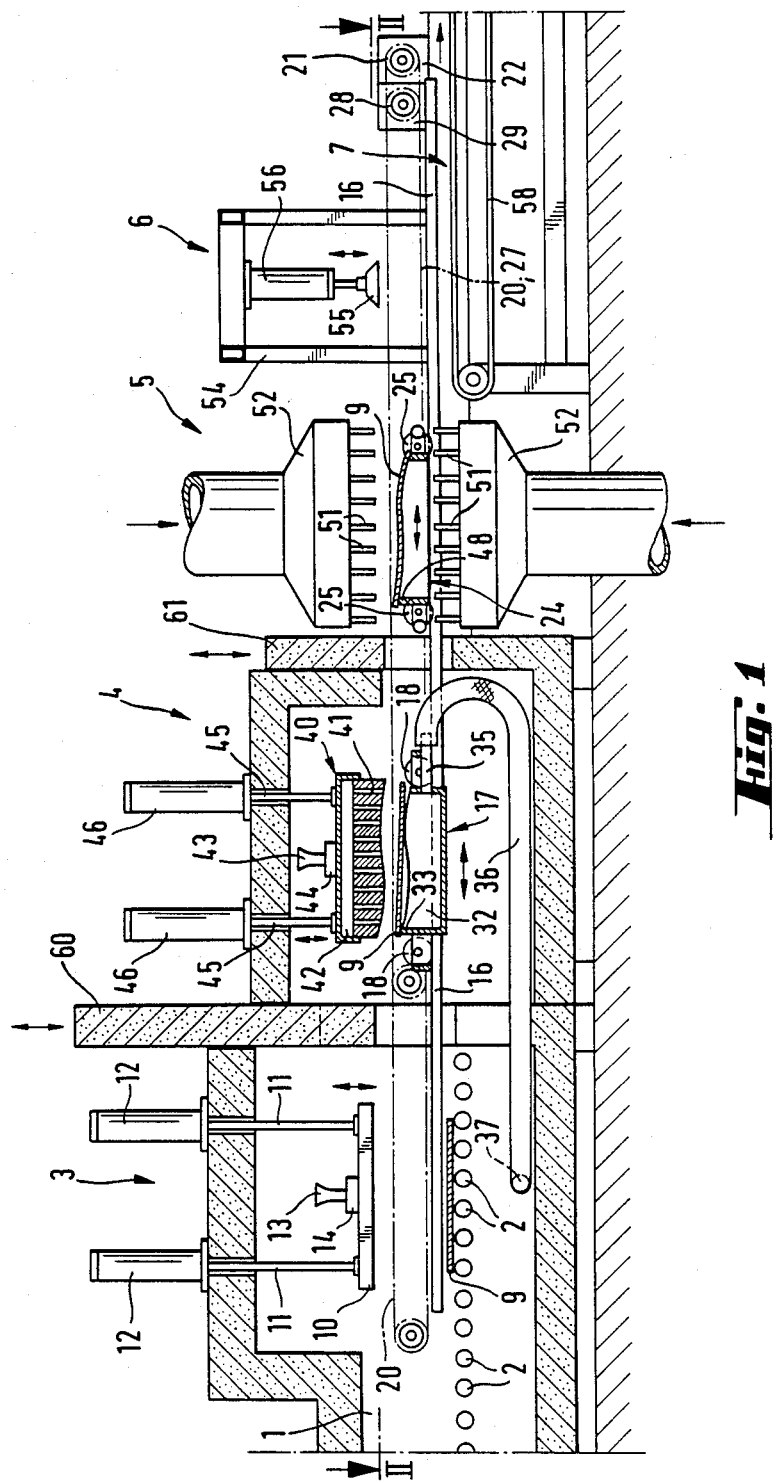
FIG. 1 is a longitudinal vertical cross-section of an installation for heating, curving and heat tempering curved automobile glazings, containing a curving station in accordance with the invention.
Figure 2:
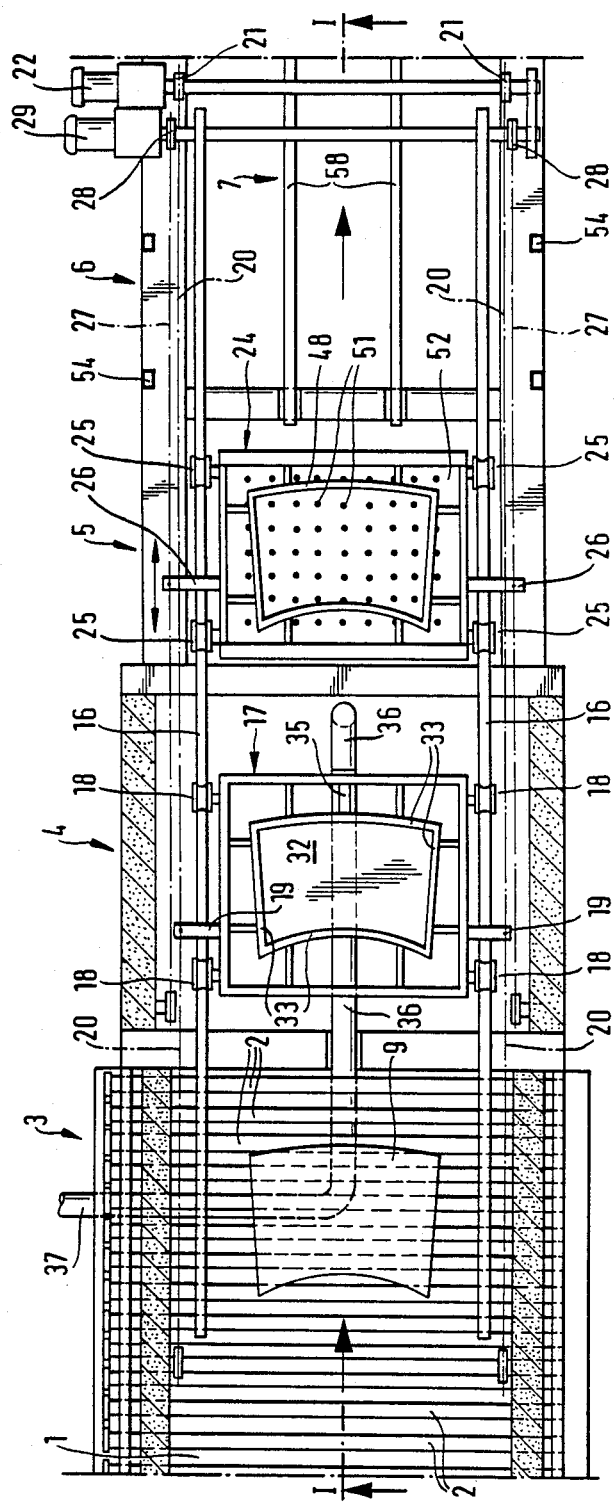
FIG. 2 is a longitudinal cross-section of the installation of FIG. 1 along line II—II.

An installation intended to manufacture tempered and curved automobile glazings, such as is shown in an overall view in FIGS. 1 and 2, essentially comprises a continuous horizontal furnace 1, in which sheets of glass are heated to the curving temperature on a horizontal transporter, for example a transporter with rollers 2, a curving station 4, a tempering station 5 and a transfer station 6 in which the completed glazings resulting from the curving and the tempering of the sheets of glass are transferred on a transporter device 7 by means of which they are transported, for example, to a checking station or a packing station.

Between the continuous horizontal furnace 1 and the curving station 4, a transfer station 3 is provided. In this transfer station 3, the sheets of glass 9 which are at the curving temperature are lifted from the transporter with rollers 2 and transferred onto an annular curving frame. For this purpose, a suction-plate 10 is mounted in the transfer station 3, which suction-plate can be moved upward and downward due to the fact that it is fixed to stems 11 of jacks 12, which can also be moved vertically between a lower position, in which the sheet of glass 9 is taken up, and a upper position which is sufficiently high to enable a curving frame to be brought under the sheet of glass 9. A vacuum centrifuge pump 13 is mounted on the suction-plate 10, the drive motor 14 of which is controlled by the central control unit of the installation. This pump 13 produces the necessary reduced pressure to raise the sheet of glass 9 from the transporter with rollers 2 and to maintain it against the suction-plate 10.

Stations 3, 4, 5 and 6 are traversed by rails 16. A cradle 17 moves on these rails 16 by means of its wheels 18 between the transfer station 3 and the curving station 4. The driving of the cradle 17 is carried out with a drive cleat 19 by means of a chain 20 which is driven by the motor 22 by means of the chain wheel 21. The motor 22 is also controlled by the central control unit of the installation.

Another cradle 24 on wheels 25 also moves on rails 16, driven by a chain 27 by means of the drive cleat 26. The driving of the chain 27 is carried out by means of the gear 28 driven by sheets of glass, is arranged behind cradle 17, can be moved between one curving station 9, the tempering station 5 and the transfer station 6. Its drive motor 29 is also controlled by the central control unit.

A pressure chamber 32 is provided on cradle 17, which moves in one direction and in the other between the transfer station and the curving station. This pressure chamber 32 has the shape of a box whose upper side is open, but whose other sides are closed. The upper edge 33 of this pressure chamber 32 corresponds, with regard to the shape of its periphery, to the shape of the curved glazings. Its upper edge 33 constitutes the annular frame of the curving press, the counterform of which is comprised by the solid form 40 arranged above the pressure chamber 32. The pressure chamber 32 is provided with a small tube 35 connected by a heat-resistant flexible pipe 36 to a pipe 37 ending in a compressor (not shown), which provides gas heated to approximately 600° C., in particular air, at the necessary pressure for the curving method.

The solid form 40 has suction due to the fact that it is provided with channels 41 which traverse it from side to side and which open into the cavity 42 provided behind it. This cavity 42 is placed under reduced pressure by a vacuum centrifuge pump 43. The vacuum centrifuge pump 43 is driven by a motor 44 controlled by the central control unit. The solid suction form 40 is mounted on stems 45 of jacks 46 so as to be capable of moving in the vertical direction. The control of the jacks 46 is also carried out by means of the central control unit.

Wagon 24 carries a support frame 48 which, by its shape and size, corresponds to the shape and the dimensions of the edge of the curved glazing. This support frame 48 serves as a transport frame during the tempering of the glazing 9 in the tempering station 5. In this tempering station 5, the glazing is suddenly air-cooled in the conventional manner by being brought between blowing nozzles 51 arranged opposite one another and coming from two blowing boxes 52.

At the end of the tempering operation, cradle 24 carrying the glazing 9 is introduced into the transfer station 6.

A vertically movable holding device 55 is mounted on a frame 54 in the transfer station 6, which device is activated by a jack 56, again controlled by the central control unit. Using the holding device 55, the tempered glazing 9 is lifted from the support frame 48 and is deposited onto transporter bands 58. The transporter bands 58 are driven in an appropriate manner, not shown in the drawings, and bring the finished glazings to the control or packing station which follows.

The method in accordance with the invention takes place in the following manner.

The sheet of glass 9 heated to the curving temperature in the continuous furnace 1 is lifted from the transporter rollers 2 by the suction-plate 10 as soon as it reaches its position beneath the section-plate 10 in the transfer station. For this purpose, the suction-plate 10 is lowered onto the sheet of glass 9 or to a short distance above said sheet, then, when it has taken up the sheet of glass 9, it is raised to a high position by means of jacks 12.

Wagon 17 with the pressure chamber 32 then passes from its end position situated inside the curving station 4, to the transfer station 3, in its other end position, precisely beneath the sheet of glass 9 held by the suction-plate 10. As soon as the cradle 17 has reached this end upstream position, the suctionplate 10 is lowered with the sheet of glass 9. When the sheet of glass 9 is at a short distance above the upper edge 33 of the pressure chamber 32 the reduced pressure in the suction-plate 10 is cut and, if necessary, a slight over-pressure is produced in the cavity 42 of the suction-plate such that the sheet of glass 9 is deposited on the upper edge 33 of the pressure chamber 32. The suction-plate 10 is then raised and the cradle 17 with the sheet of glass arranged on the pressure chamber 32 enters the curving station. During the movement of cradle 17 the door 60 provided between the transfer station 3 and the curving station 4 is open. It is reclosed as soon as cradle 17 has reaches its end position in the curving station 4.

When cradle 17 and also pressure chamber 32 have reached their end position in the curving station, beneath the solid form 40, said form is lowered onto the sheet of glass and the press in its peripheral zone against the upper edge 33 of the pressure chamber 32. At this moment gas is introduced under pressure through the flexible pipe 36 in the pressure chamber 32 and, in this pressure chamber 32 which, at present, is closed in a sealed manner at the top by means of the sheet of glass 9. There is therefore produced static pressure of between 400 and 2000 Pa, the value of which depends on the desired shape of the glazing. The static pressure must not be greater than that necessary for the exact curving of the sheet of glass, otherwise the optical quality of the final glazing obtained can be affected unfavorably. Because of this relative pressure which acts on all the surface areas of the sheet of glass and which is equal in all directions, the sheet of glass 9 is uniformly pressed against the solid form 40.

After a short period of action by the pressure, the pressure pipe 37 is closed. During this time the vacuum pump 43 has been set in operation and cavity 42 has been placed under reduced pressure, with the result that the sheet of glass 9 is maintained against the solid form by suction. The solid form 40 is then raised by means of jacks 46, taking the curved glazing held by suction. The door 60 is then opened again and cradle 17 returns to the transfer station 3. At the same time, cradle 24 with the support frame enters the curving station in which the solid form 40 carrying the glazing 9 is lowered; the curved glazing 9 is deposited on the support frame 48. The solid form 40 is again raised and cradle 9 then takes the glazing to the tempering station 5. As soon as cradle 24 has reached its position therein, the door 61 between the curving station and the tempering station is closed and air is allowed into the blowing boxes 52, which has the effect of subjecting the glazing 9 to a tempering. During this time, cradle 17 in the transfer station has taken up the next sheet of glass and the curving operation of the following sheet of glass has already started when cradle 24 takes the curved tempered glazing to the transfer station 6. After the glazing 9 has been taken up by the holding device 55, this cradle 24 is ready to receive the next curved glazing in the curving station.

Figure 3:
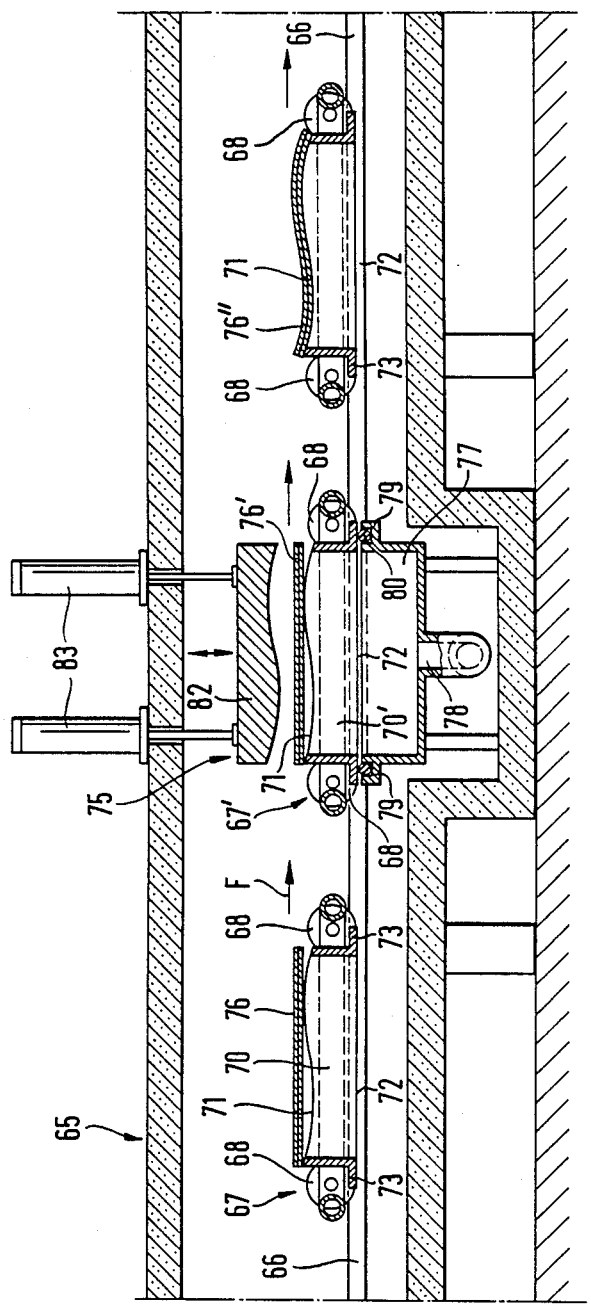
FIG. 3 is also a longitudinal cross-section of an installation for the heating, curving and cooling of a pair of sheets of glass intended subsequently to form a laminated glazing, containing a curving station in accordance with the invention.

One example of the use of the principle of the invention during the curving of a pair of sheets of glass intended for the manufacture of a laminated glazing will be described below with reference to the installation illustrated in FIG. 3. The installation comprises a continuous furnace 65, in the longitudinal direction of which rails 66 are provided on which cradles 67 are moved through the furnace on their wheels 68 in the direction of arrow F. Each cradle 67 carries an annular curving frame 70, whose upper edge 71 corresponds to the dimensions and the shape of the final curved glazings. The annular curving frames 70 are each formed by one closed lateral wall whose lower edge 72 is arranged in a plane and has a flange 73 provided all around it. Wagons 67 carrying annular curving frames 70 progress step by step through the installation.

There is a curving station 75 inside the furnace 65. In the part of the furnace 65 located before this curving station 75, the sheets of glass 76, which are laid in pairs on the curving frames 70, are heated to the temperature necessary for the curving. The part of the furnace located after the curving station 75 serves on command to cool the curved glazings.

A fixed pressure chamber 77 is provided in the curving station 75, beneath the transport plane of the curving frames 70. The pressure chamber 77 is formed by a parallelepipedal housing which is open at the top. A pipe 78 opens into the pressure chamber 77 and connects it to a compressor, which is not shown. At the level of its upper edge, the pressure chamber has a flange 79 whose upper surface is provided with a resilient sealed joint 80. Insofar as its dimensions and shape are concerned, flange 79 corresponds to flange 73 of the curving frame 70. The curving frame 70 can, in this manner, be pressed in a sealed manner against the pressure chamber 77. For this purpose, the pressure chamber 77 is, for example, mounted to be slightly movable upward and downward. It is raised after the positioning of the curving frame 70 and pressed against the flange 73 of said frame 70. With a desire for clarity, the raising mechanism of the pressure 77 is not shown in the drawings.

When one of the cradles 67, for example the one bearing reference numeral 67', carrying the sheets of glass 76' heated to the curving temperature, enters and is positioned in the curving station 75 and the sealed connection is made between the pressure chamber 77 and the curving frame 70, the solid form 82 arranged above the pressure chamber 77 is lowered by means of jacks 83 and the sheets of glass 76' are pressed all along their edges against the annular curving frame 70'. Pipe 78 ending at the compressor is then opened, such that a relative pressure with an adjustable value is immediately established inside the pressure chamber and presses the two sheets of glass 76' uniformly over their entire surfaces against the surface of the solid form 82. The result is that the pair of sheets of glass 76' take on the exact shape of this solid curving form 82.

Contrary to the known methods for curving pairs of sheets of glass, in which the sheets of glass are laid on annular frames and take on the shape of same under the effect of gravity, which necessarily always results in a secondary undesirable curving in the central area of the sheets of glass, the method in accordance with the invention enables a substantial reduction in these secondary undesirable curvings. It even enables them to be completely prevented if the temperature of the gas under pressure used is selected in such a manner that the lower sheet of glass of the pair 76' is slightly cooled, especially at least after removal of the curving pressure and during the continuation of the transport of the sheets of glass, curving of said sheets of glass under the effect of their own weight does not take place.

The method can also be operated by using, for the curving process itself, gas, for example air, at a relatively high temperature and, as soon as the pair of sheets of glass have taken on the profile of the solid curving form, by introducing cold gas into the pressure chamber 77 or by mixing cold gas with the gas already present or even by voluntarily blowing onto the lower surface of the pair of sheets of glass, inside the pressure chamber, by means of jets of cold air, so as to achieve the desired solidification of the lower sheet of glass. With a desire for simplicity, the supply pipes for the pressure chamber or for the delivery of air inside the pressure chamber, which are necessary for this purpose, have not been shown on the drawings.

As soon as the curving operation and, as necessary, the cooling operation of the lower sheet of glass are completed in the curving station, the pressure pipe 78 is closed and the solid curving form 82 is raised by means of jacks 83. Wagon 67' is then slid into the cooling zone of the continuous furnace. The pair of sheets of glass 76' have their final shape and are then cooled at the desired cooling speed.

Figure 4:
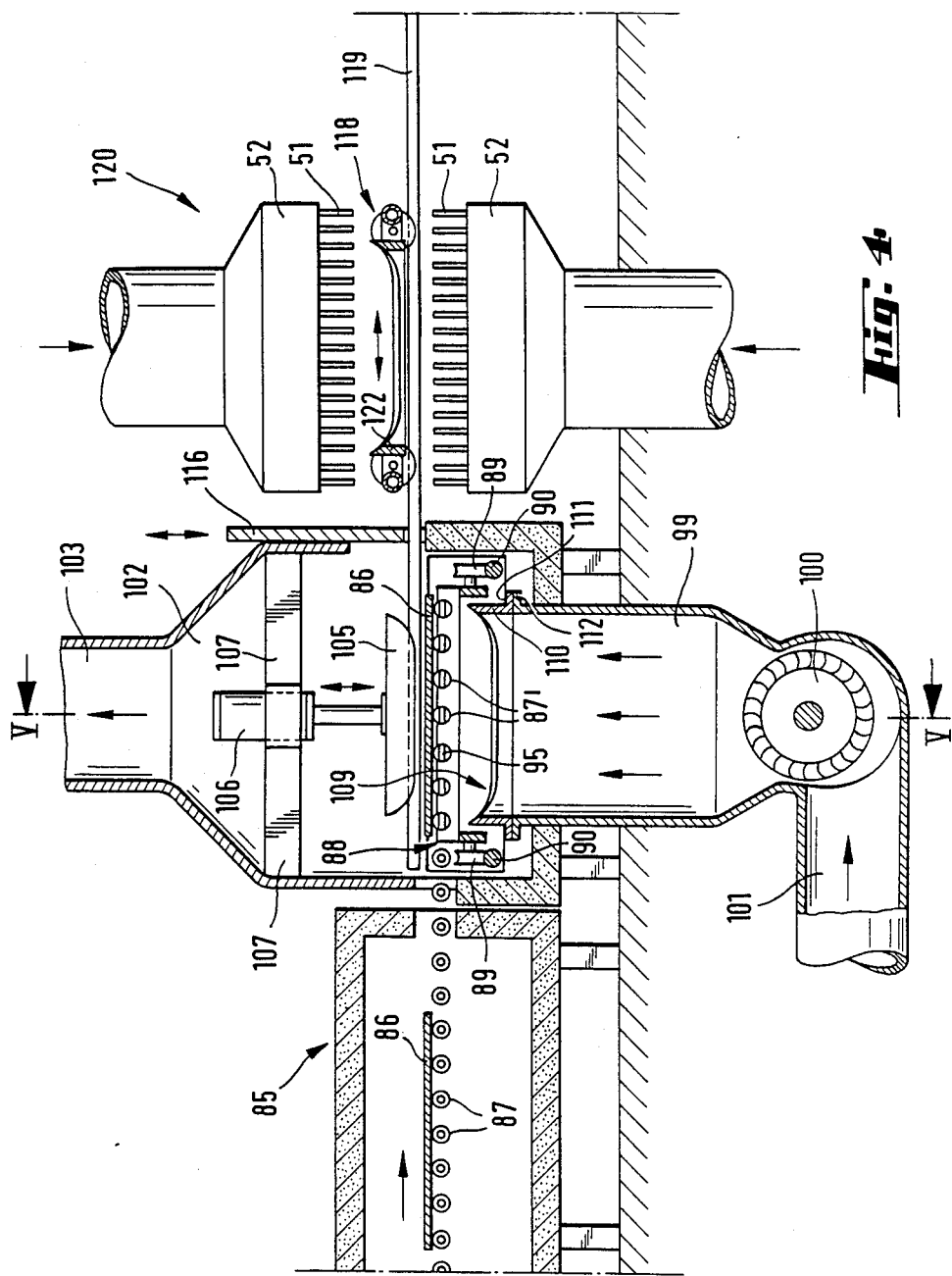
FIG. 4 is another embodiment of a curving station in which the heated sheets of glass are transported into the curving station on a transporter with rollers and the section of the transporter with rollers is separated from the area of operation of the curving tools with a view to carrying out the curving.
Figure 5:
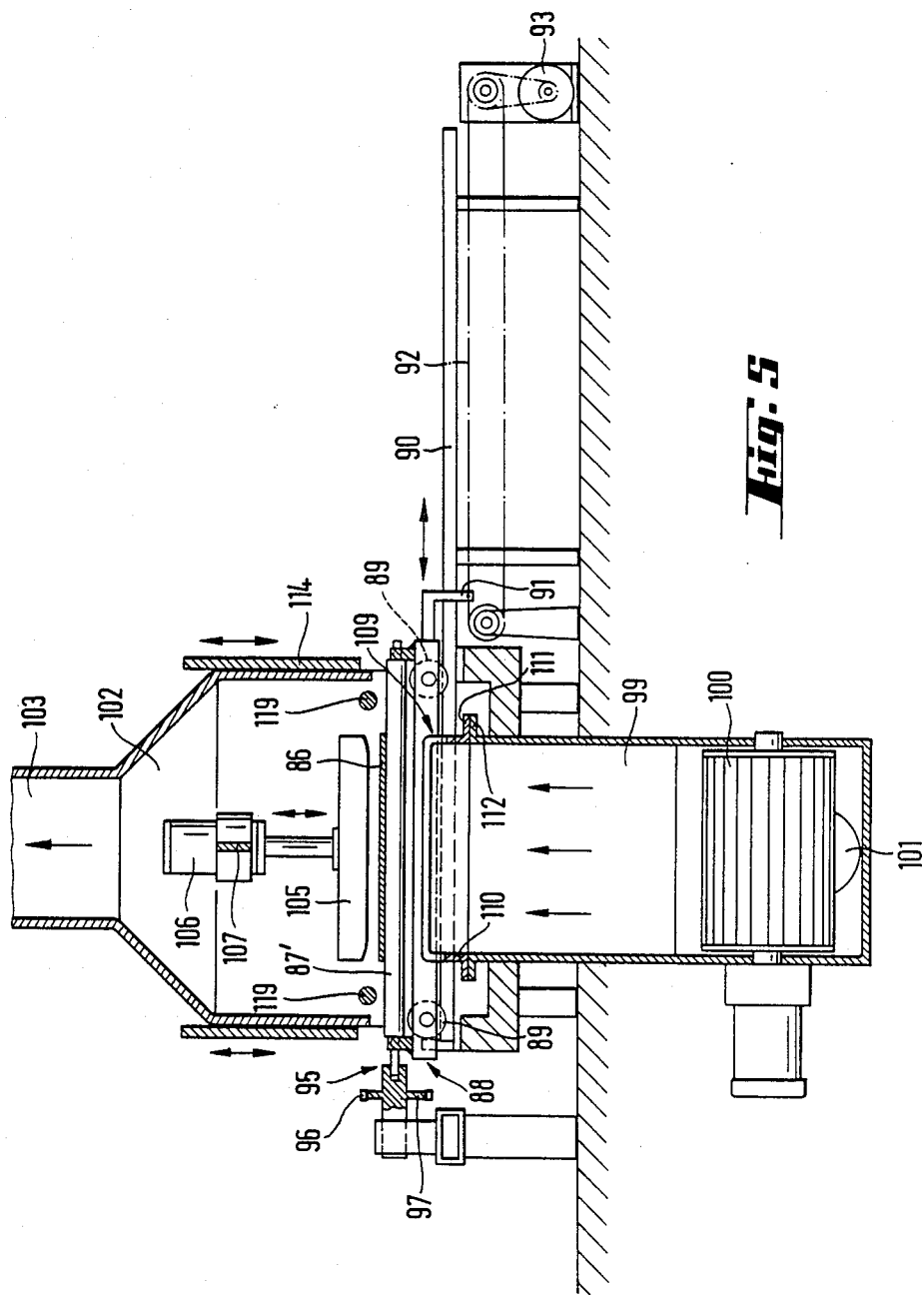
FIG. 5 is a vertical cross-section of the installation of FIG. 4 along line V—V.

Another form of carrying out the method in accordance with the invention is described in reference to FIGS. 4 and 5 and is suitable for the curving of individual sheets of glass and for the curving of pairs of sheets of glass. The curving operation will be described for individual sheets of glass which are then tempered.

The curving device itself is, in this case, also preceded by a horizontal continuous furnace 85 in which the sheets of glass 86 are heated to the curving temperature. The transport of the sheets of glass 86 is carried out on driven transporter rollers 87 which extend into the inside of the curving station. Contrary to what has been described for the device shown in FIGS. 1 and 2, an additional transfer device is not necessary in this case to provide the transfer of the heated sheets of glass from the heating furnace to the curving station.

Inside the curving station, the transporter rollers 87' are mounted in a cradle 88 which can be moved transversely to the direction of transport of the sheets of glass. The cradle 88 is provided with wheels 89 which roll on rails 90. The rails 90 come out of one side of the curving station. On these rails 90, the cradle 88 can be completely taken out of the curving station with the transporter rollers 87'. For this purpose, cradle 88 is provided with a driving cleat 91 which is brought by a chain 92 into a first end position inside the curving station and in a second end position outside the curving station. The chain 92 is driven by the motor 93 which is activated by the central control unit of the installation.

In the end position of the cradle 88 situated inside the curving station, the transporter rollers 87' are synchronized, by means of a separable coupling 95, with the driving of the other transporter rollers 87, and the common driving takes place by means of a chain 96 which passes on gears 97 mounted rotatably on the outside of the furnace or on the outside of the curving station.

In the curving station, a current of hot air can be produced such that a current of hot air with a large cross-section is directed vertically from the bottom, up against the sheets of glass. For this purpose, there is provided beneath the transporter rollers 87' a discharge pipe 99 which is supplied by a ventilator 100 by means of a predefined volume of hot air under a predefined pressure. Heating elements, which are not shown, are arranged in the suction pipe 101 of ventilator 100 and heat the air flow to a temperature of approximately 600° C. A hood 102 is installed above the transporter rollers 87' through which the flow of hot gas is captured and is removed using suction through pipe 103 being recycled in the suction pipe 101. The solid surface curving form 105 is installed in the curving station above the transporter rollers 87'. The curving form 105 is mounted so as to be vertically movable by means of the jack 106. The jack 106 is fixed in the hood 102 by means of crosspieces 107. It is activated by the central control unit.

The solid surface curving form 105 cooperates with an annular counter-form 109. This counter-form 109 is formed by the upper end of a closed crown 110 which is connected in a sealed manner by means of a flange 11 and a corresponding counter-flange 112 to the discharge pipe 99.

When the sheet of glass 86 heated to the curving temperature has entered and is positioned in the curving station, ventilator 100 is started up. The flow of hot air thus produced raises the sheet of glass 86 from the transporter rollers 87' and presses it against the surface of the solid curving form 105. This curving form 105 is then in a position slightly above the plane of the upper generatrix of the transporter rollers 87'. As soon as the sheet of glass 86 is raised from the transporter rollers 87', the cradle 88 is taken out of the curving station after opening of corresponding door 114.

As soon as cradle 88 is taken out with the transporter rollers 87' from the curving station, jack 106 is activated and the solid surface 105 curving form is lowered with the sheet of glass 86. The flow of hot air, in this case, is maintained such that the sheet of glass 86 is pressed against the curving form 105 and maintained thereagainst essentially due to the dynamic fraction of the pressure of the air flow. The sheet of glass 86 then already partially takes on the profile predefined by the curving form 105. Only the highly curved marginal areas and complex shapes cannot be obtained in this manner. The second phase of the curving operation is then useful for that purpose.

In this second phase of curving, the sheet of glass 86 is pressed with the curving form 105 against the lower annular counter-form 109. For this purpose, pipe 99 is closed in a sealed manner at its upper end and the volume flow of hot air is static pressure is then produced inside the discharge pipe 99 and crown 110. In addition to the mechanical pressure which acts on the marginal area of the sheet of glass, a gas pressure acting uniformly in all directions is thus produced over the entire surface situated inside said marginal area, and said pressure presses the sheet of glass in a sealed manner against the solid surface curving form 105. The curving form 105 is preferably bored with holes, not shown, which prevent the accumulations of air between the sheet of glass and the surface of the form.

After short period of action of the mechanical pressure in the marginal area and the static gas pressure, the curving form 105 is again raised by means of jack 106 and is brought to its upper end position. The flow of hot air then flows again and maintains the curved sheet of glass against the curving form 105. The door 116 is then opened and the cradle 118, which can be moved on the rails 119 between the curving station, the tempering station 120 and a following removal station, comes into the curving station beneath the curving form 105. There is arranged on cradle 118 a support frame 122 whose dimensions and shape correspond to the contour of the sheet of curved glass. This sheet of glass 86 is then deposited on said support frame 122 by the curving form 105 being lowered to a short distance above the support frame 122 and ventilator 100 being started up.

Wagon 118 is then moved with the curved sheet between the two blowing boxes 122 and the sheet of glass is suddenly cooled and, therefore, tempered by the jets of air flowing through the delivery pipes 51. The cradle is then brought on rails 119 to the removal station where the glazing manufactured in this manner is removed from the support frame 122 such that the cradle 118 is available for the next cycle.

Figure 6:
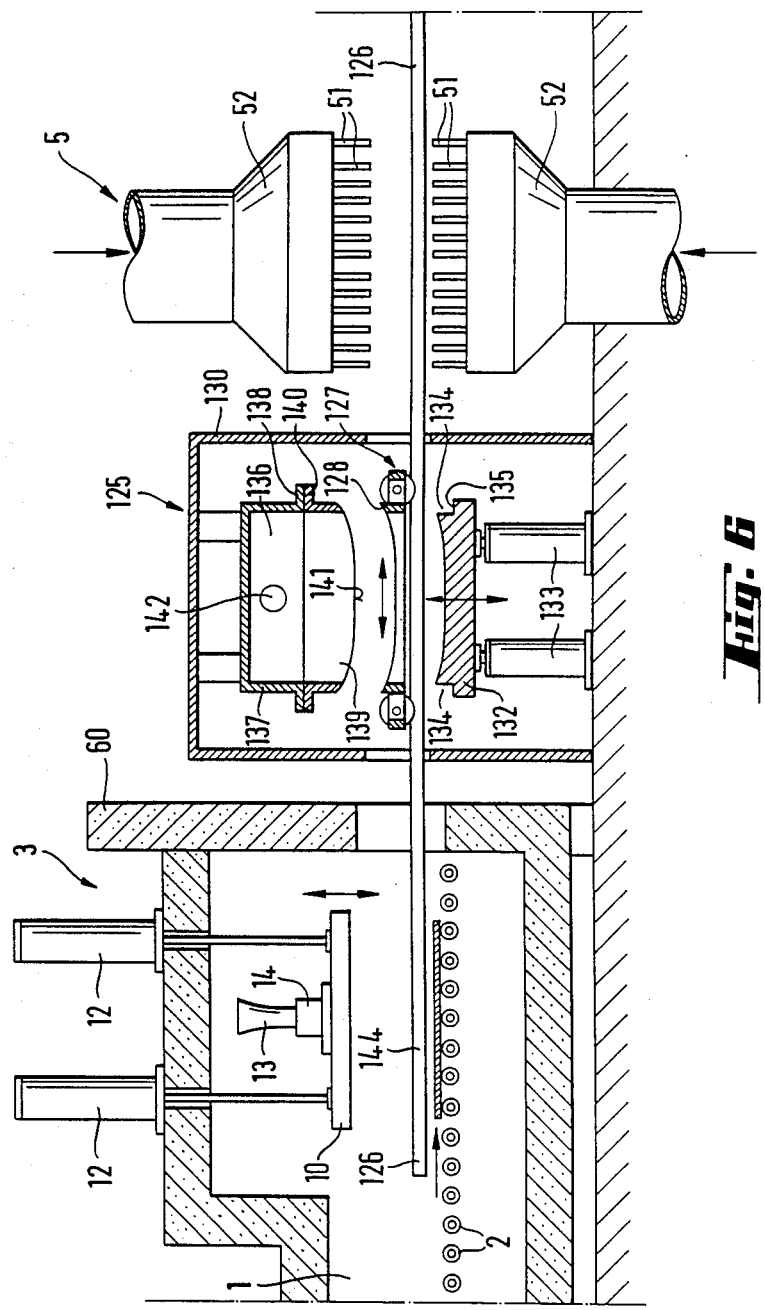
FIG. 6 is another embodiment of a curving station in which the solid surface curving form is arranged beneath the sheet of glass and the pressure chamber containing a frame is arranged above the sheet of glass.
Figure 7:
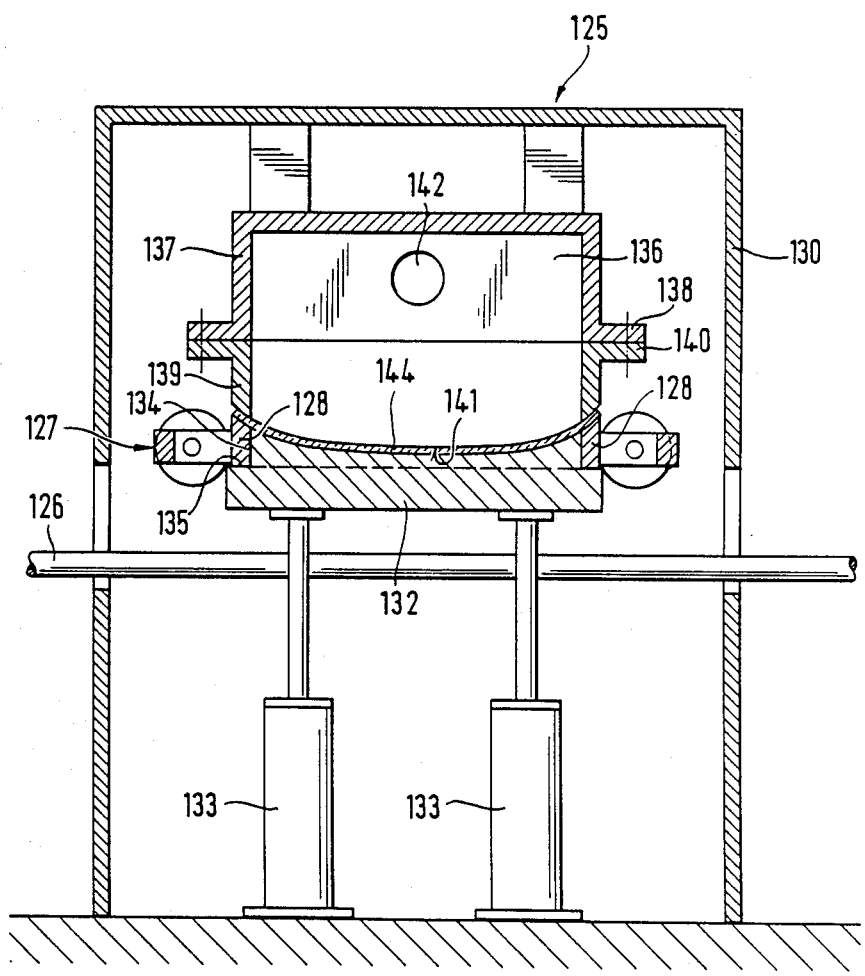
FIG. 7 is the curving station shown in FIG. 6, with the curving tools being shown in the working position.

FIGS. 6 and 7 illustrate finally another embodiment of an installation by means of which glazings with a complex shape can be manufactured in accordance with the method of the invention.

The furnace with continuous rollers 1 and the transfer station 3 correspond to the stations shown on FIGS. 1 and 2 such that reference will be made thereto.

The transfer station 3 is followed by the curving station 125, which in turn is followed by the tempering station which corresponds to the tempering station previously described in reference to FIG. 1. The treatment stations which follow one another are traversed by rails 126 on which moves a cradle 127 which carries a support frame 128 corresponding to the peripheral shape of the curved glazing.

In the curving station 125 which is adequately protected against heat losses by a covering 130 and which, if necessary, can also be heated, the solid surface curving form 132 is mounted so as to give in height beneath the transport plane. The height movement of the curving form 132 is carried out by means of jacks 133. The curving form 132 is provided, along its periphery, on the side of its upper surface, with a cavity forming a groove 134. This cavity 134 and the annular support frame 128 which is housed therein, are complementary. They fit one into the other so as to form together the solid surface of the form.

The pressure chamber is arranged above the transport plane. It is made from a chamber under pressure 137 fixedly mounted in the covering 130, the lower surface of which is opened and provided with a flange 138. A peripheral wall 139 is fixed by its flange 140 to said flange 138. The lower edge 141 of said wall 139 corresponds, with regard to its shape, to the edge of the upper surface of the support frame 128, which during the pressing operation acts as a counterform. The pipe 142, through which the hot gas is introduced under pressure into the pressure chamber, opens into the pressure chamber 136.

The sheet of glass heated to the curving temperature is brought into the curving station 125 using cradle 127. As soon as cradle 127 has reached its final position in this station, the jacks 133, which are activated by the central control unit, are activated. As is shown in FIG. 7, the curving form 132 engages, during its upward movement, the support frame 128 such that said frame adjusts in the cavity forming a groove 134 and thus completes the solid surface curving form. Since the support frame 128 then takes support on the shoulder 135 of cavity 134, during the upward movement of the curving form 132 which continues, the support frame 128 mounts in company of the cradle 127 since it is rigidly connected thereto. The sheet of glass 144 laid on the support frame is submitted to tempering by means of two blowing boxes 52 which are each provided with blowing delivery pipes 51.

FIG. 8 further illustrates another embodiment simplifying the transfer of the sheets of glass from the furnace to the curving station enabling both the processing of individual sheets and sheets associated in pairs.

As is shown in FIG. 8, the installation comprises a continuous horizontal furnace 150 in which the sheets of glass are heated to the curving temperature on a horizontal transporter 151, for example with rollers, a curving station 152, a heat treatment station 153, for example a tempering station as shown in the drawing, or annealing station depending on the glazing it is desired to manufacture, and a transfer station 154 in which the finished glazings resulting from the curving and the tempering or annealing of the sheets of glass are transferred on a transporter device 155, for example to a control station, packing station, assembly station, lamination station or the like.

The horizontal transporter 151 extends to the beginning of the curving station 152 defined by an insulating covering 156 as already explained in regard to the other embodiments.

This curving station 152 also contains a box-shaped pressure chamber 157, whose upper surface is open but whose other sides are closed. This pressure chamber 157 is supplied with hot gas under pressure by the small tube 158. The upper edge 159 of this chamber 157 constitutes an annular forming frame whose shape and dimensions correspond to those desired for the curved glazing. This annular frame is the lower component of the curving press whose upper component is a solid form 160 arranged above chamber 157. As in the preceding embodiments, in particular the one illustrated in FIG. 1, the solid form, 160 is under suction and it is mounted so as to be able to move vertically. A table with a gas cushion 161 supplied with hot gas under pressure through a small tube 162 is arranged inside the pressure chamber 157. This table 161 is mounted to move in height inside the chamber 157 by means of jacks 163.

Also present in this curving station 152 is an annular transfer frame 164 which is intended to recover the sheet of glass after its curving and to transfer it to the following station, tempering or annealing station.

Lateral components with gas cushions, not shown, arranged outside the contour of the pressure chamber 157 are also provided in order to support the edges of certain sheets of glass during their advance to be placed above table 161.

This installation functions as described below. A sheet of glass reheated to the desired curving temperature inside the furnace 150 travels on the roller transporter 151 into the curving station 152, comes up to the table with gas cushion 161 brought by the action of the jacks 163 to a height such that it comprises an extension to the transporter 151. Before being stopped above the table with gas cushion 161, the sheet of glass moves by possibly supporting its edges, when necessary, on the lateral support components with gas cushion arranged laterally outside the contour defined by the frame 159. Once stopped above the table 161, the sheet of glass is positioned precisely due to positioning systems, not shown, such as for example lateral and/or longitudinal pushes, for example connected to the walls of the chamber 157 or the table 161.

Table 161 is then retracted by being lowered inside the pressure chamber 157 by means of jacks 163 and the sheet of glass is then taken up by the upper edge 159 of said chamber 157, which forms the annular frame.

The upper press component which is composed of the solid form 160 is then brought down and is applied onto the sheet of glass. At the same time, the pressure is applied in the pressure chamber 157 by means of the hot air sent through the small tube 158.

As already indicated with regard to the other embodiments, the sheet of glass is thus conformed to the desired profile, because of the pressure at the upper part of the solid form 160, the static pressure of the hot gas at the lower part in the central area of the sheet of glass, and the support area composed of the frame 159. After a certain time of pressing, cold air can be vent into the pressure chamber to assist the hardening of the sheet of glass.

When the sheet of glass is curved, the solid form 160 is raised, while reduced pressure is applied through it, which enables the curved sheet of glass to be raised at the same time.

The transfer frame 164 then enters the curving station 152 and places itself beneath the curved sheet of glass held by the solid form 160. The reduced pressure through said solid form 160 is cut and the release of the sheet of glass on frame 164 takes place. Frame 164 bearing the sheet of glass leaves the curving station and transfers it to the next station 153, the tempering or annealing station. After that, the curved and tempered or annealed glazing is delivered to the transfer station 154.

Insofar as it is desired to curve two sheets of glass necessary for the composition of a laminated glazing, the frame 164 bearing a first sheet of glass, having left the curving station, waits in a heated chamber contiguous to the curving station. During this time a second sheet of glass is in the curving station undergoing the curving treatment. When it is curved and the solid form 160 is raised, maintaining through suction said second sheet of glass against it, frame 164 bearing the already curved first sheet of glass again enters the curving station, and is placed under the solid form 160 to receive the second sheet of glass.

The two sheets of glass superposed in this manner in a hot atmosphere can, if necessary, perfectly take the form of one another so as to have exactly the same curvature.

The frame 164 thus carrying the two sheets of glass is then transferred to the heat treatment station 153 which follows, generally an annealing station for sheets of glass intended to comprise a laminated glazing.

As an alternative, when it is a matter of curving two sheets of glass intended to comprise a laminated glazing, a solid upper form 160 can be combined with a suction box with lateral walls forming a skirt and surrounding said solid form, leaving however a space through which the reduced pressure can be provided between the skirt and the solid form as described in prior art patent documents published under the numbers FR 2,085,464, EP 240,418 and EP 241,355.

This alternative is not illustrated in the drawings. Using such a system, the two superposed sheets of glass can be taken into the curving station, arranged on the table 161, curved by pressing and action of the static pressure of hot gas, then raised both together when the upper form is raised, and then deposited on the transfer frame 164.

This installation in accordance with FIG. 8 and its alternative do not call for a device for holding the sheets of glass in order for them to pass from the furnace 150 to the curving station 152.

The result is a simplification, the absence of handling likely to produce marks and defects, also the possibility of working sheets of glass with an enamel deposit on their upper surface, which deposit at the time of the transfer from the furnace to the curving station is still liquid and fragile. A few moments later at the time of pressing in the curving station, the enamel additionally has the time to solidify and harden and is therefore more capable of coming into contact with the solid upper form 160.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A method for curving sheets of glass, comprising heating sheets of glass to their curving temperature in a horizontal position in a continuous furnace, pressing said sheets is a curving station adjacent to the continuous furnace by applying said sheets against an annular frame in a sealing manner and pressing same against a solid surface curving form which together with said frame defines a curving form having upper and lower components, transferring said sheets to a cooling station on a support frame, wherein the sheets of glass in the curving station, during the pressing between the annular frame and the solid surface form, are pressed in the area located inside the annular frame, against the solid surface curving form, by producing static pressure in a pressure chamber whose end surface is defined by the annular frame and which is closed by the sheet of glass.

2. The method in accordance with claim 1, wherein the sheets of glass are arranged in the continuous furnace on a transporter formed by successive driven transporter rollers, are heated to the curving temperature and are then lifted from the transporter, at the end of the continuous furnace or in a transfer station which follows the continuous furnace, by means of a suction-plate which can be moved upward or downward, said sheets of glass are then deposited onto the lower component of the curving press.

3. The method in accordance with claim 1, wherein the sheets of glass laid on an annular frame are transported on said frame through the continuous furnace and are heated to the curving temperature therein, with the lower surface of said annular frame when in the curving station being connected with a pressure chamber in a sealed manner.

4. The method in accordance with claim 3, wherein a pair of sheets of glass to be subsequently laminated in order to form a safety glazing is laid on the annular frame and is curved in one single operation.

5. The method in accordance with claim 1, further comprising transporting the sheets on a transporter formed by transporter rollers driven successively through the continuous furnace and into the curving station and, in said curving station, raising each sheet above the transporter rollers by a current of hot gas delivered from below said sheet, pressing said sheet against the solid surface curving form by means of said current, which can be moved upward and downward above the transporter rollers, withdrawing the transporter rollers from in the curving area, and pressing the solid surface curving form with the sheet of glass against a lower annular counter-form comprised of the upper end of the discharge pipe delivering the gas current, which defines a pressure chamber in which is generated static pressure to assist the curving of said sheet.

6. The method in accordance with claim 1, wherein the value of the static pressure acting on the glass is between 400 and 2000 Pa.

7. The method in accordance with claim 1, comprising supporting the sheets of glass in the curving station on a table procedure with a gas cushion inside said pressure chamber, then, moving said table relative to said annular frame, defined by the upper edge of the walls of the pressure chamber in which the table with a gas cushion is provided, pressing said sheets on the annular frame against the solid form using static pressure of hot gas delivered in the pressure chamber to assist said pressing.

8. The method in accordance with claim 7, further comprising holding a curved sheet of glass after curving by suction against the solid form, raising said solid form holding said curved sheet bringing a frame under the solid form and recovering the curved sheet of glass thereon, passing said frame with the sheet of glass into a heated chamber while a second sheet of glass is curved and, after curving of said second sheet of glass, recovering the second sheet of glass on the frame carrying the first sheet of glass which, thus superposes said second sheet on said first sheet.

9. The method in accordance with claim 7, wherein, is therebetween two superposed sheets of glass are pressed simultaneously and then raised with the solid form, being held thereagainst before being deposited onto a frame brought into the curving station by application of suction between said solid form and a skirt surround it.

10. The method in accordance with claim 1, further comprising after said step of curving using a static pressure of hot gases under pressure in a pressure chamber, sending cold gases into the pressure chamber to thereby harden the glass.

11. An installation for curving glass sheets, comprising a continuous furnace with rollers, a curving station and a cooling station downstream of the curving station, wherein the curving station comprises an upper curving form with a solid surface, which can be moved upward and downward together with means for effecting said movement, and a lower annular curving frame, wherein said lower annular curving frame is formed by the upper edge of the wall of a pressure chamber which can be placed under pressure by supplying a hot gas thereto, and means for supplying said hot gas.

12. The installation in accordance with claim 11, wherein the upper solid surface curving form comprises means for applying suction to said sheets, against which form, after the curving operation, the curved sheet of glass is held, further comprising a support frame arranged on a movable cradle.

13. The installation in accordance with claim 11, wherein the pressure chamber is movable and mounted on a cradle which translated between said furnace and cooling station.

14. The installation in accordance with claim 11, wherein the annular curving frame has the shape of a crown comprising a flange which can be connected to the fixed part of the pressure chamber.

15. The installation in accordance with claim 11, further comprising a table with a gas cushion in the curving station, inside the pressure chamber and movably mounted relative to the upper edge forming the frame of the pressure chamber, and thus enabling, following a relative movement, the taking up of the sheet of glass to be curved by said upper edge forming a frame.

16. The installation in accordance with claim 15 wherein the upper solid form comprises a skirt surrounding it, while providing between said skirt and said upper form a space in which suction is applied, and means for creating said suction.

17. An installation for curving glass sheets, comprising a continuous furnace, a curving station and a cooling station which follows the curving station, said curving station comprising a solid surface upper curving form mounted movably upward and downward in the curving station and means for affecting said movement, and annular curving frames which transport the sheets of glass through the continuous furnace, with the curving station and the cooling station comprising closed lateral walls as well as a lower flange which cooperates in a sealed manner with a pressure chamber in the curving station beneath the transport frame.

18. An installation for curving glass sheets, comprising a continuous furnace with transport rollers, a curving station and a cooling station which follows the curving station, wherein the successive transporter rollers extend into the curving station, and the transporter rollers arranged inside the curving station are mounted on a movable cradle which can be laterally removed from the curving station after raising of the sheet of glass above the transporter rollers, and means for laterally moving said rollers, said curving station further comprising a vertical discharge pipe provided with a ventilator producing a current of hot gas beneath the movable transport rollers, and a solid surface curving form which can be moved upward and downward above the movable transporter rollers, further comprising an annular counter-form comprised of the upper edge of the discharge pipe.

19. The installation in accordance with claim 18, wherein the transporter rollers in said curving station are connected to the drive mechanism of the preceding transporter rollers by a separable coupling.

20. The installation in accordance with claim 18, further comprising a support frame which can be introduced into the curving station in order to recover the curved sheet of glass and transport it to the cooling station.

21. The installation in accordance with claim 18, wherein the annular curving frame has the shape of a crown comprising a flange which can be connected to the fixed port of the pressure chamber.

22. An installation for curving glass sheets, comprising a continuous furnace with rollers, a curving station and a cooling station downstream of the curving station, the curving station comprising an upper annular curving frame and a lower curving form with a solid surface, wherein the upper annular curving frame is formed by a lower edge of a pressure chamber which is able to be placed under pressure by a hot gas, but which is otherwise closed, and means for supplying said gas, and the lower solid surface curving form is comprised of an annular part which contacts the marginal area of the sheet of glass and by a second component of the solid surface form occupying the surface situated inside said annular part, the annular frame part being capable of being separated from the solid surface form part and capable of being moved, as a transport frame for the sheet of glass, after the curving operation into the following cooling station, and means for separating and moving said transport frame.

23. The installation in accordance with claim 22, further comprising means for moving said annular part to said furnace and means to engage heated glass sheets on said annular part.

24. The installation in accordance with claim 22, wherein the lower solid surface form comprises a shoulder which supports the annular frame, means for raising the assembly in order to bring it against the lower edge of the upper pressure chamber and means for lowering said solid surface form, with the annular frame during said lowering becoming detached from the solid form and acting solely as a transport frame into a following cooling station.

* * * * *